(12) United States Patent
Tedjini et al.

(10) Patent No.: US 9,455,769 B2
(45) Date of Patent: Sep. 27, 2016

(54) RFID COMMUNICATION SYSTEM

(71) Applicants: Institut Polytechnique De Grenoble, Grenoble (FR); TAGSYS, La Ciotat (FR)

(72) Inventors: Smail Tedjini, Beaumont les Valence (FR); Yvan Duroc, Valence (FR); Gianfranco Andia Vera, Valence (FR); Christophe Loussert, Aix-en-Provence (FR); Marc Recouly, La Ciotat (FR)

(73) Assignees: INSTITUT POLYTECHNIQUE DE GRENOBLE, Grenoble (FR); TAGSYS, La Ciotat (FR)

( * ) Notice: Subject to any disclaimer, the term of this patent is extended or adjusted under 35 U.S.C. 154(b) by 0 days.

(21) Appl. No.: 14/440,657

(22) PCT Filed: Nov. 7, 2013

(86) PCT No.: PCT/IB2013/002628
§ 371 (c)(1),
(2) Date: May 5, 2015

(87) PCT Pub. No.: WO2014/072812
PCT Pub. Date: May 15, 2014

(65) Prior Publication Data
US 2015/0288424 A1 Oct. 8, 2015

Related U.S. Application Data

(60) Provisional application No. 61/723,552, filed on Nov. 7, 2012.

(51) Int. Cl.
*H04B 5/00* (2006.01)
*G06K 19/07* (2006.01)
*G06K 19/077* (2006.01)

(52) U.S. Cl.
CPC ......... *H04B 5/0062* (2013.01); *G06K 19/0723* (2013.01); *G06K 19/07766* (2013.01); *H04B 5/0081* (2013.01); *H04B 5/0087* (2013.01)

(58) Field of Classification Search
CPC ..................... G06K 19/07786; H01Q 1/2208
USPC ........................................................ 455/41.1
See application file for complete search history.

(56) References Cited

U.S. PATENT DOCUMENTS 3,944,928 A 3/1976 Augenblick et al.
5,626,630 A 5/1997 Markowitz et al.

FOREIGN PATENT DOCUMENTS

EP 2098979 A1 9/2009

OTHER PUBLICATIONS

International Search Report, related to PCT/IB2013/002628, dated Apr. 24, 2014, 2 pages.

*Primary Examiner* — Eugene Yun
(74) *Attorney, Agent, or Firm* — Moreno IP Law LLC

(57) ABSTRACT

An RFID communication system comprises an interrogator including a signal generator for generating an interrogation signal at a predetermined frequency $f_0$ and a first interrogator antenna for transmitting said interrogation signal and receiving a first reply signal at a frequency $f_0$, and processing means, and a passive transponder including a first transponder antenna for transmitting said first rely signal and receiving said interrogation signal and a chip comprising nonlinear components for generating said first reply signal in response to the interrogation signal. The interrogator is arranged to receive a second reply signal whose frequency is a multiple of the predetermined frequency $f_0$, said multiple being either odd or even, said second reply frequency being generated by the nonlinear components of the transponder chip, said first and second reply signals being processed by the processing means of the interrogator in order to complete or improve the functionality of the system.

14 Claims, 6 Drawing Sheets

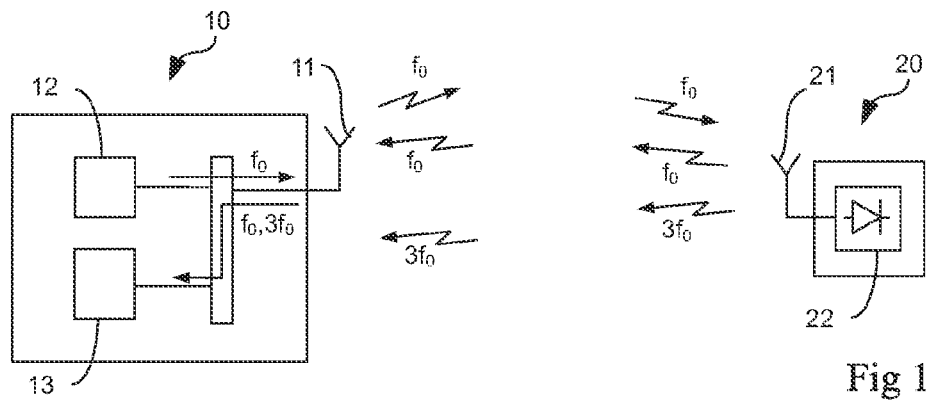
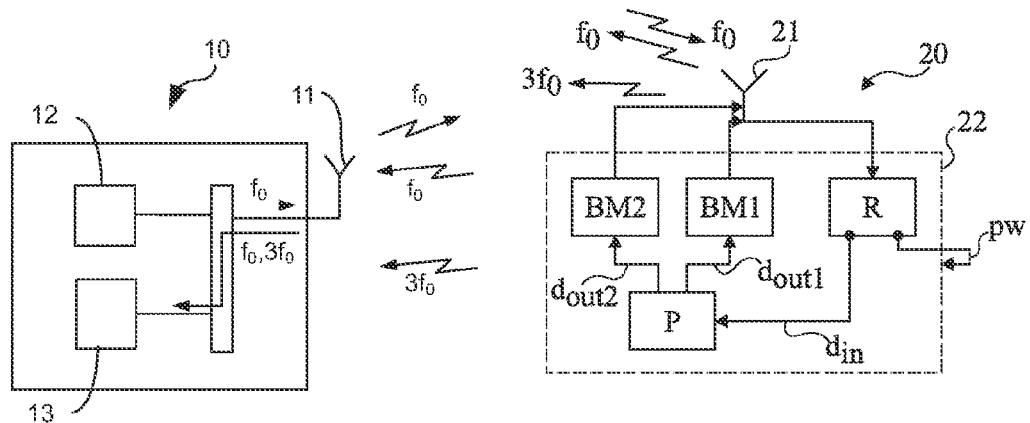
Fig 2
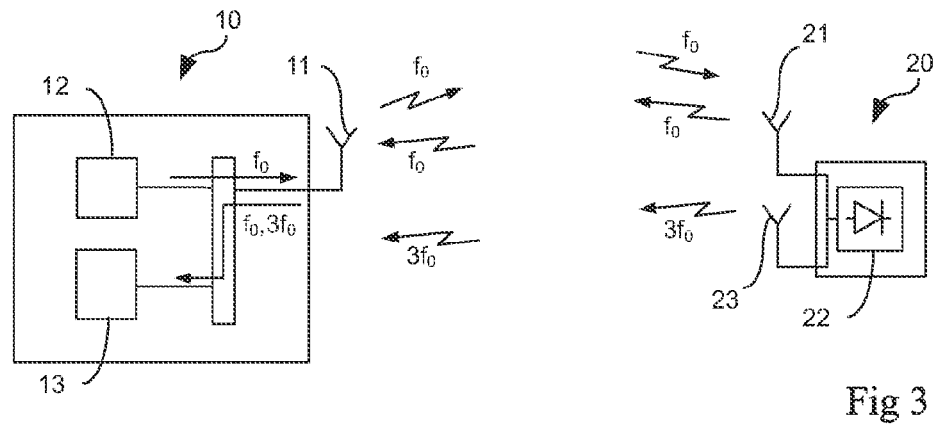
Fig 3
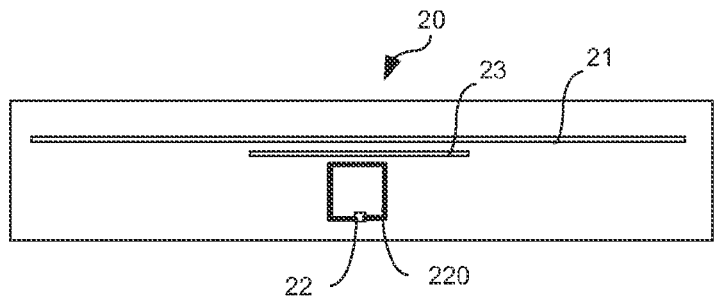
Fig 4

RFID COMMUNICATION SYSTEM

CROSS-REFERENCE TO RELATED APPLICATION

This application claims priority from U.S. provisional application 61/723,552, filed on Nov. 7, 2012, the contents of which is hereby incorporated by reference to the maximum extent permitted by the law.

TECHNICAL FIELD

The present invention relates to a RFID communication system.

BACKGROUND OF THE INVENTION

Radio Frequency Identification (RFID) is a wireless data-collection technology that is becoming very popular in many services industry, logistics, manufacturing, security. The RFID system is composed by at least one interrogator (or reader) and one transponder (or tag) both interchanging information in a wireless mode. The transponder is generally fixed or tied to an object to be detected or to be monitored. The interrogator acts as base station, interacting with the transponder in order to read or write information.

In the case of passive UHF RFID transponders, the interrogator transfers energy wirelessly to the transponder by sending Radio Frequency (RF) power that the transponder may profit to obtain DC power to operate and respond at certain frequency using the backscattering modulation technique. The passive UHF RFID transponder is equivalent to an antenna loaded by a chip (integrated circuit). One of the tasks that the chip may perform is a rectification, function in which the chip obtains energy to operate as transponder. A rectifier then converts the Alternating Current (AC) that came in the RF waves sent by the interrogator into Direct Current (DC) allowing the chip to realize its rest of duties as transponder. The architecture of the rectifier is generally based on a Cockcroft-Walton circuit with two or more diode-based voltage doubler stages. The diode determines the nonlinear behavior of the chip. Another task of the chip is to generate a reply signal to the interrogator using the backscattering modulation technique. This task is also performed by nonlinear components.

One will note that, in the present application, the expression "passive RFID transponder" also designates a RFID transponder that uses the backscattering modulation technique in order to communicate with the interrogator, but in which the chip is powered by another source of energy such as a battery incorporated in the tag or a photovoltaic device. Such transponders are also called "battery assisted passive tags", or "semi-passive tags", and correspond to class-3 transponders according to the EPC global standardization organization. In this type of passive RFID transponders, the chip does not need to comprise a rectifier for obtaining DC power from the wireless signal emitted by the interrogator.

The nonlinear behavior of the chip generates backscattered harmonics. Until now, the presence of these backscattered harmonics is not exploited i.e. the interrogator and the transponder are designed to process only the fundamental frequency and not harmonics.

SUMMARY OF THE INVENTION

According to the invention, a portion of the harmonics is processed by the system in order to improve its functionality or to provide additional functions to the system.

Thus, the invention concerns a RFID communication system comprising an interrogator including a signal generator for generating an interrogation signal at a predetermined frequency $f_0$ and a first interrogator antenna for transmitting said interrogation signal and receiving a first reply signal at a frequency $f_0$, and processing means, a passive RFID transponder (=passive RFID tag) including a first transponder antenna for receiving said interrogation signal and a chip comprising nonlinear components for generating said first reply signal in response to the interrogation signal, said first reply signal being transmitted by said first transponder antenna;

characterized in that the interrogator is arranged to receive a second reply signal whose frequency is a multiple of the predetermined frequency $f_0$, said multiple being either odd or even, said second reply frequency being generated by the nonlinear components of the transponder chip, said first and second reply signals being processed by the processing means of the interrogator in order to complete or improve the functionality of the system.

Thus, according to the invention, harmonics of the main frequency $f_0$ are intentionally detected and processed by the interrogator. The detection of the harmonics creates additional transmission channels in which redundant information or additional information can be transmitted.

The additional channel can be used to carry the same information than those carried in the main channel (at the fundamental frequency $f_0$) or to carry additional information.

So, in a first embodiment, the first and second reply signals carry the same data.

In a second embodiment, the first and second reply signals carry different data.

In one embodiment, the even harmonics generated by the RFID transponder are not exploited since they carry only a low level of information from the transponder.

Thus, according to one embodiment, the frequency of the second reply signal is an odd multiple of the predetermined frequency $f_0$.

In a preferred embodiment, the frequency of the second reply signal is equal to $3f_0$ which is the odd harmonic with the highest level of subcarrier generated by the transponder.

According to another embodiment, the frequency of the second reply signal is an even multiple of the predetermined frequency $f_0$.

In a specific embodiment, the interrogator comprises a second interrogator antenna arranged for receiving the second reply signal.

In a specific embodiment, the transponder comprises a second transponder antenna arranged for transmitting the second reply signal with a high gain.

In this embodiment, the first and second transponder antennas are for example electric dipoles. The first transponder antenna is for example a half wavelength line ($\lambda/2$) and the second transponder antenna is a line having a length of $\lambda/6$.

In a variant, the transponder comprises only one transponder antenna, i.e. the first transponder antenna, which is a dual band antenna adapted to receive the first and second reply signals. The first transponder antenna is for example an inverted F antenna or a slot antenna.

In a variant, the first transponder antenna comprises a first inductive loop resonating at the predetermined frequency $f_0$, and a second inductive loop resonating at the frequency of the second reply signal.

In a variant, the first transponder antenna further comprises a first radiating track connected to the first inductive loop, and a second radiating track connected to the second inductive loop.

According to an embodiment, the first and second reply signals comprise coded data and, when said first and second reply signals are received by the RFID interrogator, the processing means of the RFID interrogator detects the simultaneous reception of said first and second reply signals and only decodes the data of the first reply signal.

According to another embodiment, the first and second reply signals comprise coded data and, when said first and second reply signals are received by the RFID interrogator, the processing means of the RFID interrogator detects the simultaneous reception of said first and second reply signals and decodes the data of the first and second reply signals. In this embodiment, when the first and second reply signals carry the same data, decoding the data of the first and second reply signals provides data redundancy which allows possible transmission errors to be corrected.

BRIEF DESCRIPTION OF THE DRAWINGS

FIG. 1 is a schematic view of a first embodiment of the system of the invention;

FIG. 2 is a schematic view of a variant of the first embodiment;

FIG. 3 is a schematic view of a second embodiment of the system of the invention;

FIG. 4 is a schematic view of a passive tag of the system of FIG. 3;

DETAILED DESCRIPTION OF PREFERRED EMBODIMENTS

Figure 5:
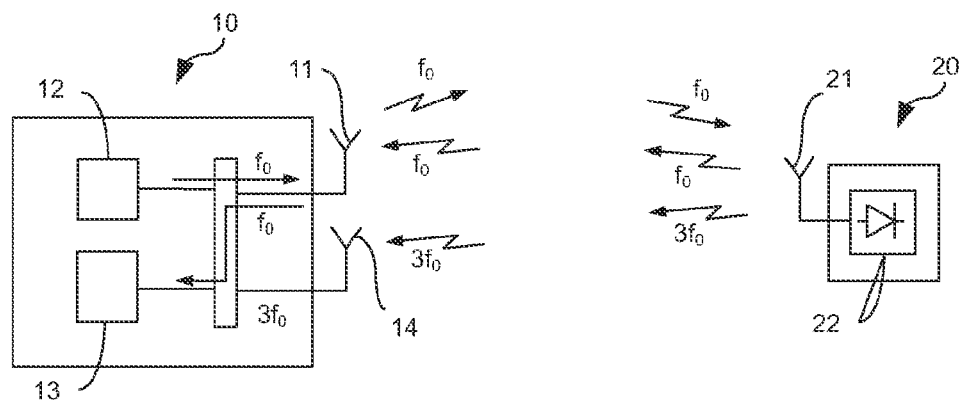
FIG. 5 is a schematic view of a first embodiment of the system of the invention.

According to the invention, the harmonics backscattered by the passive RFID transponder (or passive RFID tag) are used in the RFID communication system to carry same data of those carried by the main channel at the fundamental frequency $f_0$ or to carry other data. The backscattered harmonics constitute additional communication channels in which additional or redundant data are transmitted.

The backscattering in a RFID communication system comprising an interrogator and a RFID transponder is described in detail in the document "On the measurement of the Delta Radar Cross section ($\Delta RCS$) for UHF tags", S. Skali, C. Chantepy, S. Tedjini, IEEE International conference on RFID, 2009.

Measurements have shown that odd and/or even harmonics are backscattered by the passive RFID transponder when the interrogator broadcasts an interrogator signal at a fundamental frequency $f_0$. So, according to the invention, the interrogator of the system is adapted to make use of these harmonics signals.

Preferably, the system makes uses of odd harmonics of the fundamental frequency $f_0$ since odd harmonics generally have a higher level of subcarrier than even harmonics.

Preferably, the system makes use of the third harmonics ($3f_0$) that has the highest level of subcarrier generated by the passive RFID transponder.

However, the described embodiments are not limited to the use of odd harmonics. In a variant, the system may use even harmonics, or a combination of odd and even harmonics.

FIG. 1 is a schematic view illustrating a first embodiment of a RFID communication according to the invention.

The system comprises an RFID interrogator 10 and a passive RFID transponder 20 that is for example fixed to an object to be monitored.

The RFID interrogator comprises a signal generator 12 for generating an interrogation signal at a predetermined frequency $f_0$ (fundamental frequency) and an interrogator antenna 11 for transmitting the interrogation signal and receiving a first reply signal at a frequency $f_0$ and a second reply signal at a frequency $3f_0$ backscattered by the passive RFID transponder 20. It also comprises processing means 13 for processing the first and second reply signals.

The fundamental frequency $f_0$ is for example around 900 MHz and the third harmonics around 2700 MHz. The described embodiments are however not limited to these particular frequencies. The fundamental frequency $f_0$ may for example be in the ISM frequency bands including but not limited to 433 MHz, 2.45 GHz, 5.8 GHz, etc. Furthermore, for a given fundamental frequency $f_0$, the backscattered harmonic used by the system as the second reply signal is not limited to the third one.

The passive RFID transponder 20 comprises a transponder antenna 21 for receiving said interrogation signal and a chip 22 comprising nonlinear components for generating the first reply signal at the frequency $f_0$ and the second reply signal at the frequency $3f_0$ in response to the interrogation signal. The second reply signal is caused by the nonlinear components of the chip.

The first and second reply signals are broadcasted to the interrogator 10 by the transponder antenna 21.

In this embodiment, the transponder antenna is a dual band antenna adapted to receive the first and second reply signals. This dual band antenna has a narrow band around the frequency $f_0$ and a narrow band around the frequency $3f_0$. This antenna is for example an inverted F antenna or a slot antenna.

The first and second reply signals can carry redundant data. In that case, the same data are included in the first and second reply signals. These two reply signals carry for example an identification code associated to the transponder. These data are generated by the chip 22.

In a variant, the first and second reply signals carry different data. For example, the first reply signal carry an identification code associated to the transponder and the second signal carry a sensor value coming from a sensor connected to the chip.

FIG. 2 is a schematic view illustrating a variant of the system of FIG. 1, in which the first and second reply signals carry different data. In this variant, the chip 22 of the RFID transponder 20 comprises a receiving circuit R, connected to the antenna 21 and adapted to receive the interrogation signal at frequency $f_0$, and to provide a supply signal pw, for example a DC signal, for powering the chip, and an input data signal $d_{in}$ representative of data contained in the interrogation signal. One will note that in the case of a battery assisted passive RFID transponder, the supply signal pw of the chip may be produced directly by a battery of the transponder. In the variant of FIG. 2, the chip 22 further comprises a processing circuit P, adapted to receive the input data signal $d_{in}$ and to provide first and second output data signals $d_{out1}$ and $d_{out2}$. For example, the first output data signal $d_{out1}$ carries an identification code associated with the transponder and the second output data signal $d_{out2}$ carries a sensor value coming from a sensor connected to the chip. The behavior of the transponder is to prioritize the transmission of one source of information, for example the first output data signal $d_{out1}$, on the fundamental harmonic, and of the second source of information, for example the second output data signal $d_{out2}$, on the third harmonic. In the example of FIG. 2, this is achieved by using two backscatter modulators BM1 and BM2. The two modulators may be encapsulated in the same chip or in two different chips. The output of the modulators can be connected or tapped at different ports of a unique dual port antenna, or on two different antennas, tuned on the fundamental frequency and the third harmonic respectively. In this example, the input of the modulator BM1 receives the output data signal $d_{out1}$ and the input of the modulator BM2 receives the output data signal $d_{out2}$. One of the modulators (the modulator BM1 in this example) produces more modulation depth on the fundamental carrier, and the other modulator (the modulator BM2 in this example) produces more modulation depth on the third harmonic.

FIG. 3 is a schematic view illustrating a second embodiment of a RFID communication according to the invention. In this embodiment, the transponder comprises a second antenna 23 adapted to broadcast the second reply signal, at the frequency $3f_0$ in this example. The first reply signal is thus broadcasted by the antenna 21 and the second reply signal is broadcasted by the antenna 23.

FIG. 4 is a schematic view of a RFID transponder 20 having two distinct electrical antennas. In this figure, the RFID transponder comprises a RFID chip 22 equipped with a magnetic loop 220 forming a magnetic antenna and two electric dipoles forming the antennas 21 and 23. The antenna 21 is a half wave dipole and the antenna 23 is a dipole having a length of $\lambda/6$. If $f_0=900$ MHz, the length of the antenna 21 is substantially equal to 16.7 cm and the length of the antenna 23 is substantially equal to 5.5 cm. The presence of the antenna 23 permits to increase the gain of the second reply signal by at least 10 dB.

FIG. 5 is a schematic view illustrating a third embodiment of a RFID communication system according to the invention. In this embodiment, the interrogator comprises a second antenna 14 adapted to receive the second reply signal, at the frequency $3f_0$ in this example.

Figure 6:
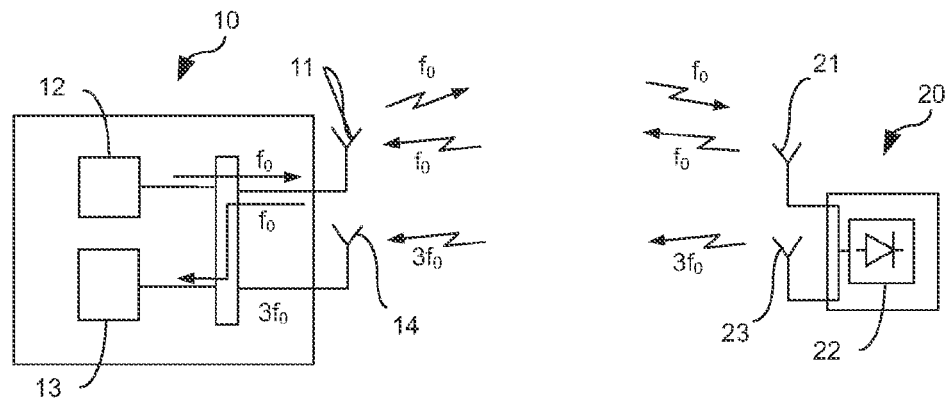
FIG. 6 is a schematic view of a first embodiment of the system of the invention.

FIG. 6 is a schematic view illustrating a fourth embodiment of a RFID communication according to the invention. This embodiment is a mix of the second and third embodiments. In this embodiment, the transponder comprises a second antenna 23 adapted to broadcast the second reply signal, at the frequency $3f_0$ in this example, and the interrogator comprises a second antenna 14 adapted to receive this second reply signal.

This system can be used in many applications. In a first application, it can be used for detecting the presence of objects in the range (or vicinity) of the interrogator. RFID transponders are mounted on the objects to be detected. When the interrogator broadcasts the interrogation signal at the frequency $f_0$, the RFID transponder backscatters this signal and returns the first reply signal at $f_0$ and the second signal, at $3f_0$ in this example, these two reply signals carrying data related to the RFID transponder, for example an identification code.

In a second application, the system can be used for detecting the presence of objects in the range (or vicinity) of the interrogator and retrieving data associated to these objects, for example the movement speeds of these objects. When the interrogator broadcasts the interrogation signal at the frequency $f_0$, the RFID transponder backscatters this signal and broadcasts the first reply signal at $f_0$ and the second signal, at $3f_0$ in this example, these two reply signals carrying data related to the RFID transponder, for example an identification code. Based on these two signals, the interrogator detects the presence of the RFID transponder broadcasting these signals and estimates the Doppler speed of the RFID transponder based on the second reply signal ($3f_0$). This estimation is based on the Doppler Effect which increases with the speed of the object moving towards the RFID interrogator. For a given speed of the object equipped with a passive RFID transponder, the measured variation of frequency $\Delta F$ is equal to the speed of the object divided by the backscattered frequency wavelength: $\Delta F=-V_{object}/\lambda$. In the present case, the use of the second reply signal, at $3f_0$ in this example, increases the detection resolution by a factor of 3. In this application, the system can for example follow the movement of objects equipped with RFID transponders on a conveyor. It also permits to distinguish the moving objects (on the conveyor) and the static objects (not on the conveyor).

In another application, the system can be used for detecting the presence of objects in the range (or vicinity) of the interrogator and retrieving measurement data coming from a sensor mounted on the objects. The measurement data are introduced in the second reply signal by the chip of the RFID transponder. In this application, the second reply signal includes data that are not present in the first reply signal.

Figure 7:
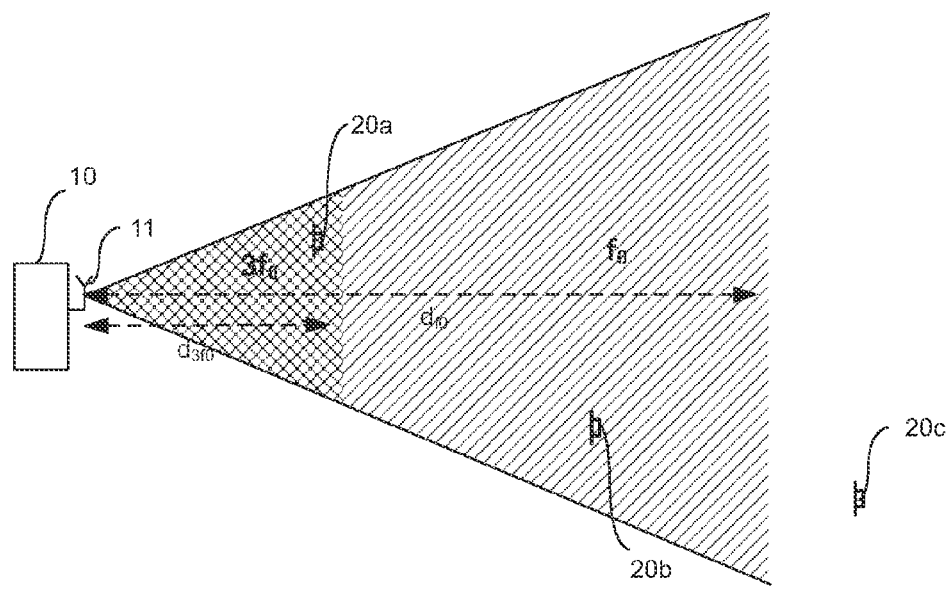
FIG. 7 is a schematic view illustrating a first application of the system of the invention.

In another application, when receiving the first and second reply signals, the processing means of the interrogator only decode the data of the first reply signal. The level of the second reply signal received by the interrogator being quite low (about −85 dBm), it may be not possible to decode the data contained in the second reply due to its poor signal to noise ratio and thus the Bit Error Rate would be too high for an efficient detection. So the processing means of the interrogator would only estimate the presence of a data stream reply of the second reply signal without trying to actually decode the bit stream. The estimation could be based on the correlation in time domain of baseband signals of both reply signals, at $f_0$ and $3f_0$ in this example. If both time frames match in time and are synchronized, the likelihood of a third harmonic backscattering of a given transponder is high enough to be taken into account The system can thus be used for localizing a RFID transponder in a limited area. When the interrogator receives simultaneously the two reply signals, it identifies the RFID transponder by decoding the data included in the first reply signal and the simultaneous detection of the carrier of the second reply signal informs that the identified RFID transponder is present at a reduced distance of the interrogator. Indeed, the signal path loss in free air propagation is proportional to the frequency of operation. For a given path length between the transponder and the interrogator, the higher the frequency of operation, the weaker the received signal. Despite the fact that the transponder would be powered at given maximum distance from the interrogator, its backscattered signal at $3f_0$ may not be received due to the higher attenuation at that frequency. Friss equation shows that the received power is proportional to the square of the wavelength. Therefore for a higher operating frequency $3f_0$, the received power will be 9 times lower. This application is illustrated by the FIG. 7. It shows a system comprising an interrogator 10 and three passive transponders 20a, 20b and 20c. The hatched area is the radiating area of the interrogator antenna 11 at $f_0$ and the crosshatched area, which is included in the hatched area, is the radiating area of the interrogator antenna 11 at $3f_0$. In this figure, the transponder 20c is outside of the hatched area and therefore can not be powered by this signal. The distance $d_{f0}$ designates the distance beyond which the transponders can not be powered any more. The distance $d_{3f0}$ designates the distance beyond which the second signal at $3f_0$ backscattered by the transponders can not be received by the interrogator. In this figure, the transponder 20a is present in the crosshatched area. So the interrogator 10 receives the first and second reply signals from the transponder 20a and can deduce that this transponder is localized in a limited area around it. By contrast, the transponder 20b being outside of the crosshatched area, the interrogator 10 can only receive the first reply signal from this transponder 20b. It can only deduce that the transponder 20b is further than the transponder 20a.

In one embodiment, one of the interrogator antennas or the interrogator antenna is chosen to have a good matching and gain at the third harmonic frequency. The received signal at $3f_0$ can be treated by a dedicated signal processing electronics simultaneously to the main backscattered signal at $f_0$. The use of an interrogator antenna operating at $3f_0$ can improve the RFID detection system in two different ways:

a) for a given overall dimension, an antenna will have a higher gain at $3f_0$ than at $f_0$. If we consider that the efficiency is the same at both frequencies, the antenna aperture will be 3 times narrower at $3f_0$ than at $f_0$. This smaller aperture can be used for the discrimination within a group of transponders which are all powered and backscattered at $f_0$ but only a subset of them will be able to be detected by the $3f_0$ antenna as the detection beam is narrower and thus can only retrieve $3f_0$ backscatterings from RFID passive transponders within this smaller beam. For an optimized efficiency (near 0.9-1), the formula thereafter shows that the gain and the area are proportional to the square of the frequency of operation:

$$G = \frac{4\pi A_{eff}}{\lambda} = \frac{4\pi A_{phys} e_a}{\lambda^2},$$

wherein G is the gain of the antenna, $A_{phys}$ is the radiating area of the antenna and $e_a$ is the efficiency.

Figure 8:
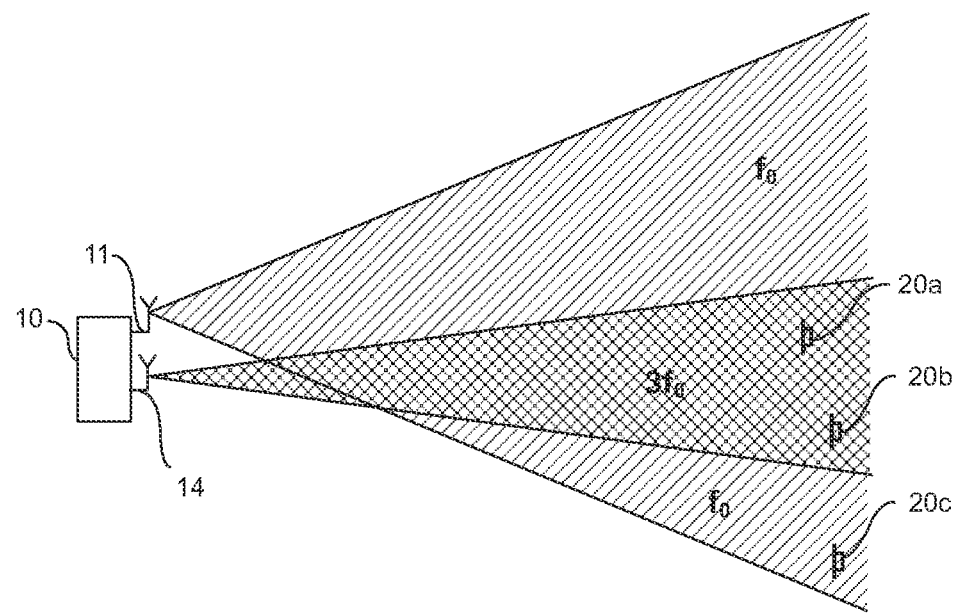
FIG. 8 is a schematic view illustrating a second application of the system of the invention.
Figure 9:
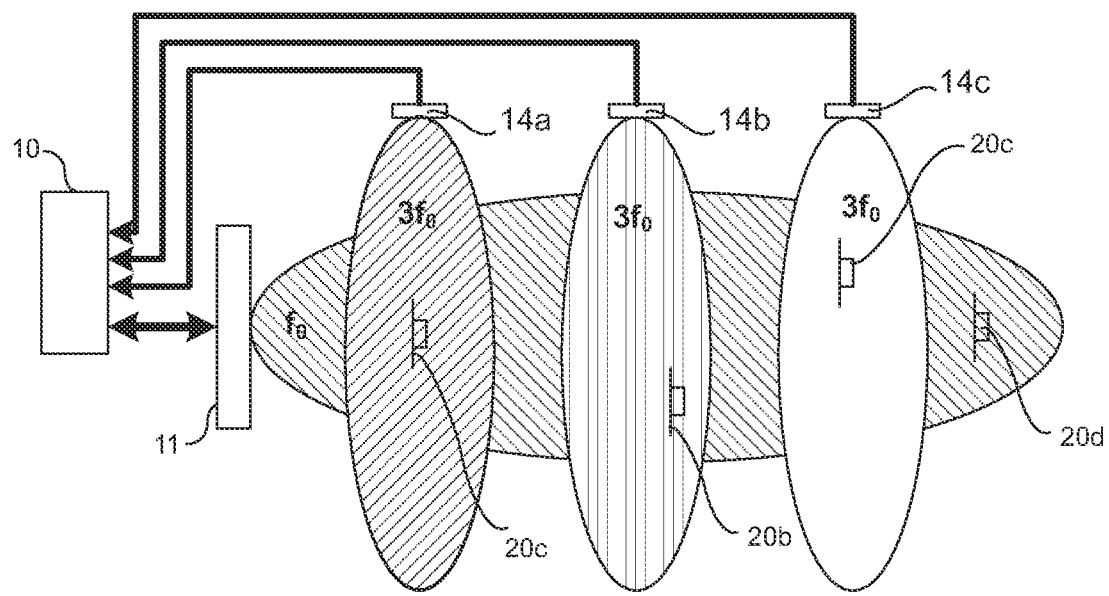
FIG. 9 is a schematic view illustrating a third application of the system of the invention.

This is illustrated by FIG. 8 where the interrogator 10 has an antenna 11 for receiving the first rely signal at $f_0$ and an antenna 14 for receiving the second reply signal at $3f_0$. Transponders 20a et 20b are localized in the radiating area of the antenna 14 (crosshatched area). The second reply signals coming from these two transponders are thus received by the interrogator 10. By contrast, the second reply signals coming from the transponder 20c positioned outside the radiating area of the antenna 14 is not received by the interrogator 10.

b) for an equivalent gain and efficiency, an antenna operating at $3f_0$ will be 3 times smaller. A typical circular patch antenna of 6 to 8 dBi of gain will be 240 mm wide at 900 MHz but 80 mm wide at 2700 MHz. This much smaller size allows to easily multiply the number of points of RFID transponder signal detection in a room for example, allowing to well delimitate areas where a simple localization of groups of transponders can be done using the $3f_0$ backscattered signals detected by each antenna in the room or warehouse. This is illustrated by FIG. 9 where the interrogator 10 has an antenna 11 for receiving the first rely signal at $f_0$ and a plurality of antennas 14a-14c for receiving second reply signals at $3f_0$ and where the antennas 14a-14c cover distinct areas.

The signals at $f_0$ and $3f_0$ can be received by the same antenna designed as to have two optimized matching at both frequencies, thus limiting the system at one single antenna. This dual band antenna can be designed to have a smaller aperture at $3f_0$ thus benefiting from the improvement in RFID transponders localization.

Another major improvement comes from the multiple path limitations when signal bounces back from conductive surfaces around the transponders like walls of floors, ceilings. The path loss increase due to the higher frequency and the narrower aperture of the antenna reduces drastically the undesirable effects of transponders stray backscattering's strong at $f_0$ but considerably reduced at $3f_0$.

Figure 10:
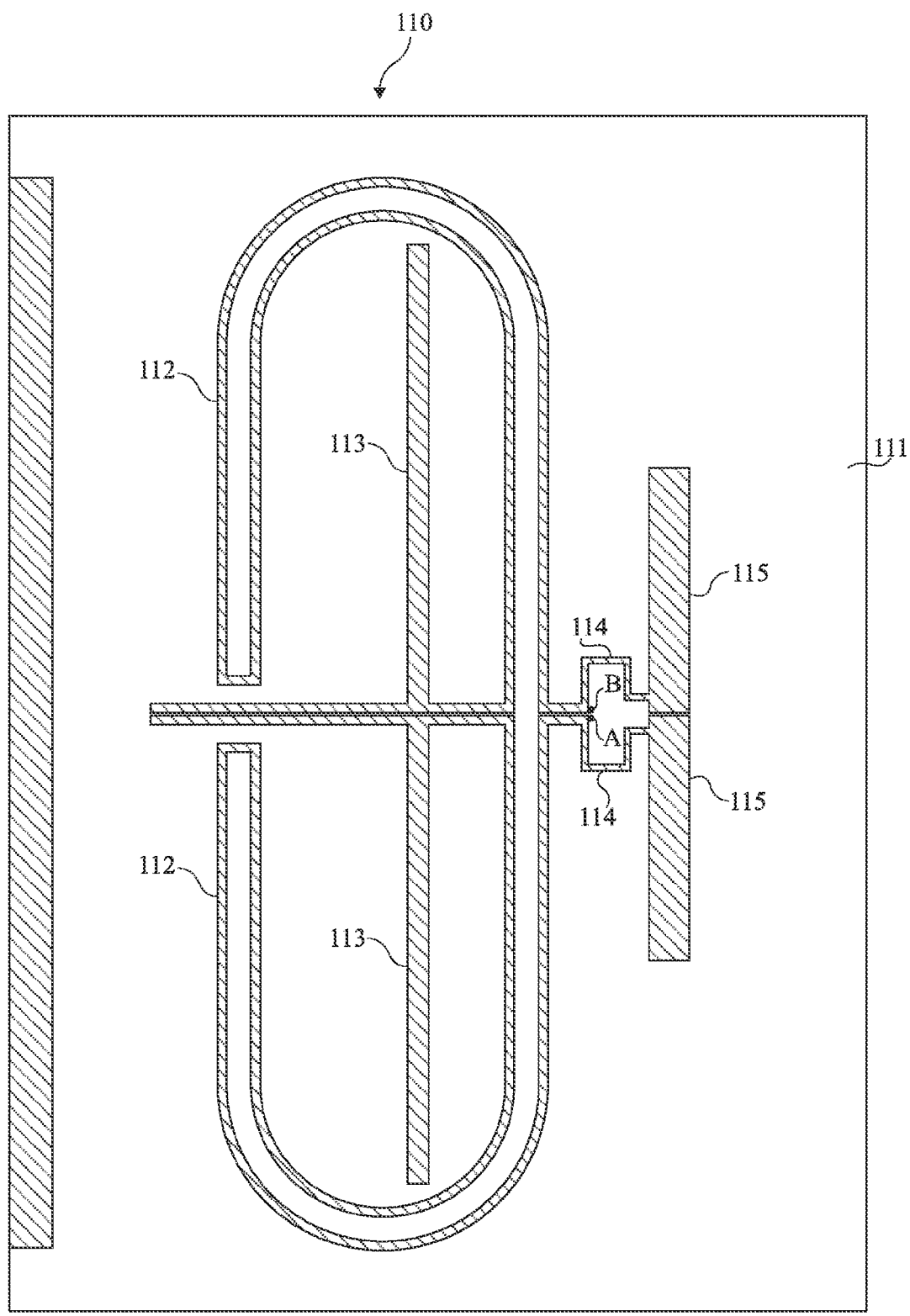
FIG. 10 is a schematic view illustrating an example of a transponder antenna design compatible with the described embodiments.
Figure 11:
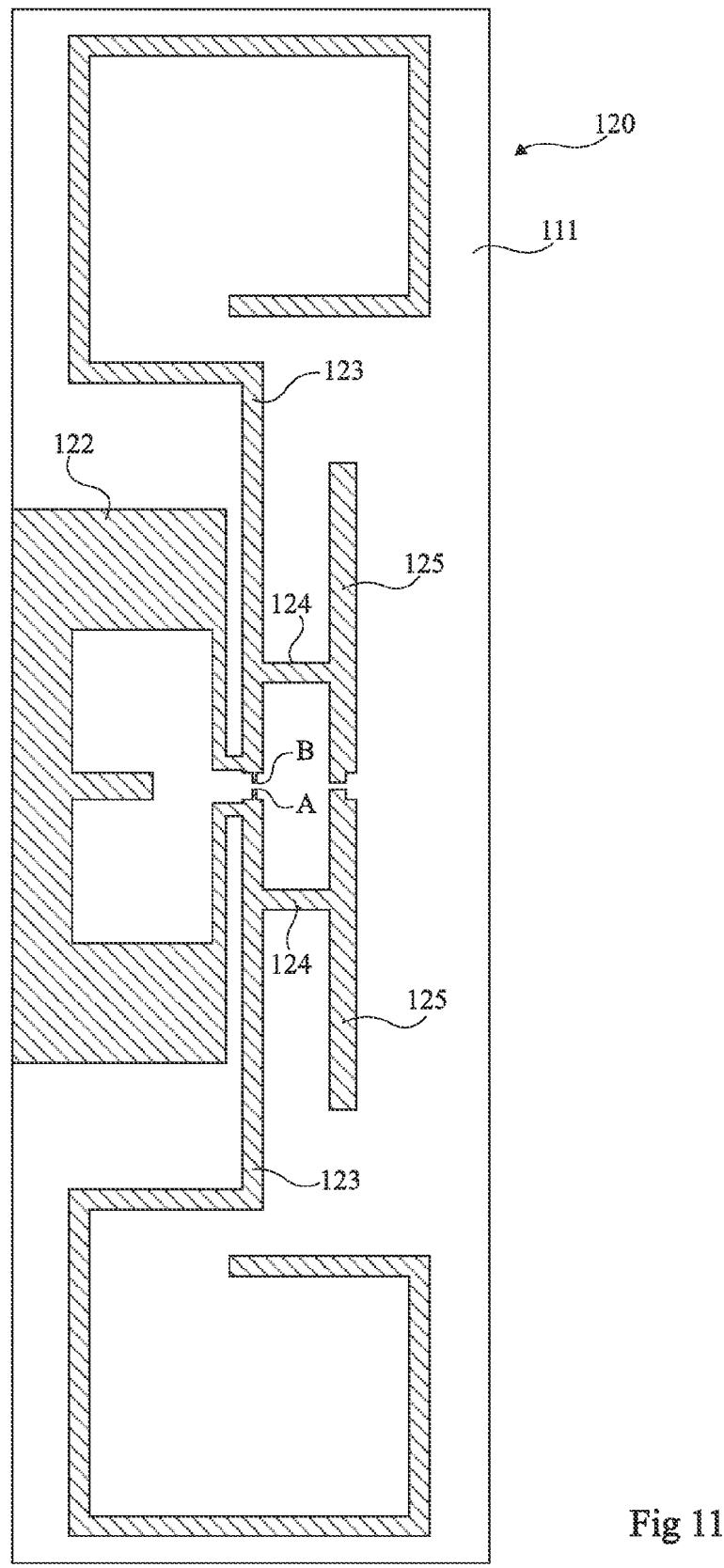
FIG. 11 is a schematic view illustrating another example of a transponder antenna design compatible with the described embodiments.
Figure 12:
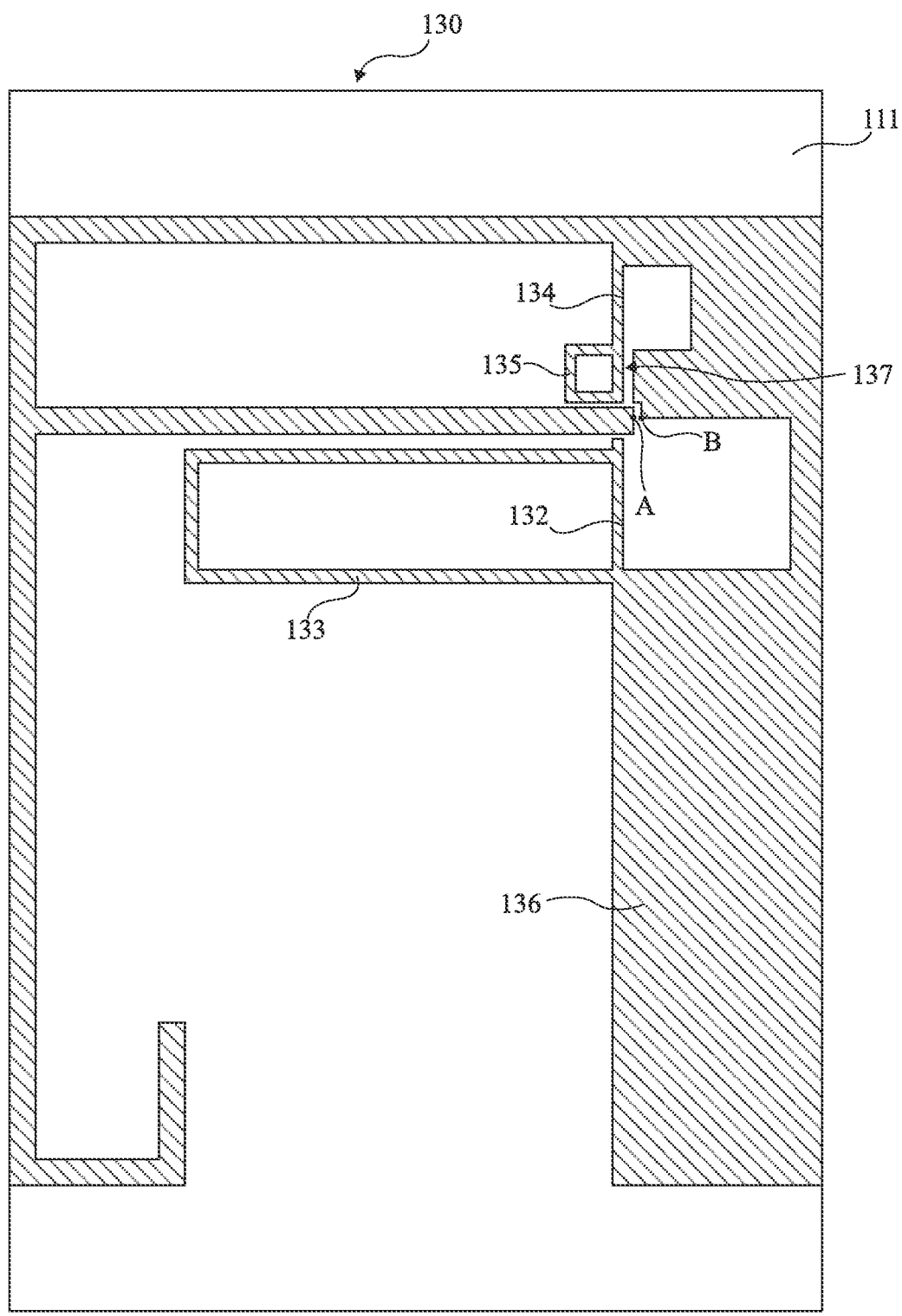
FIG. 12 is a schematic view illustrating another example of a transponder antenna design compatible with the described embodiments.

In the above described embodiments, the transponder antenna can have different designs with the chip directly connected to the antenna, as illustrated by FIGS. 10, 11 and 12. The antenna may be designed taking into account impedance measurements of the chip of the transponder at the fundamental harmonic $f_0$ and at the selected higher rank harmonic ($3f_0$ in the illustrated examples). Impedance matching at these frequencies allows a good reading range to be obtained both at the fundamental frequency $f_0$ and at the selected higher rank harmonic.

FIGS. 10, 11 and 12 are schematic views illustrating respectively three examples of dual band transponder antennas 110, 120 and 130 compatible with the described embodiments.

In these examples, the antennas 110, 120 and 130 are made of a conductive material, for example metal, disposed on an insulating substrate 111, for example a polymeric substrate such as PET, PEN, Polyimide, Polycarbonate, etc. Each of the antennas 110, 120 and 130 comprises two terminals A and B for connecting the chip of the transponder to the antenna.

The antenna 110 of FIG. 10 comprises a first inductive loop 112, divided into two U shaped portions respectively connected to terminal A and to terminal B, and a first straight radiating track 113 connected to the inductive loop 112. In this example, the first radiating track 113 is divided into two parts respectively connected to the two U shaped portions of the first inductive loop 112. The antenna 110 also comprises a second inductive loop 114, divided into two U shaped portions respectively connected to terminal A and to terminal B, and a second straight radiating track 115 connected to the inductive loop 114. In this example, the second radiating track 115 is divided into two parts respectively connected to the two U shaped portions of the second inductive loop 114. The first inductive loop 112 resonates at the fundamental frequency $f_0$, and the second inductive loop 114 resonates at the third harmonic frequency $3f_0$.

The antenna 120 of FIG. 11 comprises a first one turn inductive loop 122, having its extremities respectively connected to terminal A and to terminal B, and a first radiating track 123 connected to the inductive loop 122. In this example, the first radiating track 123 is divided into two parts respectively connected to the two extremities of the inductive loop 122, each part having the shape of a rod, curled at an extremity opposite to the terminal A or B to which it is connected. The antenna 120 also comprises a second inductive loop 124, divided into two U shaped portions respectively connected to terminal A and to terminal B, and a second straight radiating track 125 connected to the inductive loop 114. In this example, the second radiating track 125 is divided into two parts respectively connected to the two U shaped portions of the second inductive loop 124. The first inductive loop 122 resonates at the fundamental frequency $f_0$, and the second inductive loop 124 resonates at the third harmonic frequency $3f_0$.

The antenna 130 of FIG. 12 comprises a rectangular conductive band 136 comprising a first hole having a substantially rectangular shape, the first hole defining a first inductive loop 132, and a second hole having a substantially rectangular shape, the second hole defining a second inductive loop 134. The first and second holes are interconnected by a slot 137 opened in the rectangular conductive band. The terminals A and B of the antenna are disposed on opposite sides of the slot 137. A first rectangular conductive ring 133, forming a first radiating track, is connected to the conductive band 136, close to the first inductive loop 132, and a second rectangular conductive ring 135, forming a second radiating track, is connected to the conductive band 136, close to the second inductive loop 134. The first inductive loop 132 resonates at the fundamental frequency $f_0$, and the second inductive loop 134 resonates at the third harmonic frequency $3f_0$.

Although the invention has been described in connection to specific embodiments, it is to be understood that it is in no way limited thereto and that it includes all the technical equivalents of the means described as well as their combinations should these fall within the scope of the claimed invention.

The invention claimed is:

1. A RFID communication system comprising:
   an RFID interrogator including a signal generator for generating an interrogation signal at a predetermined frequency $f_0$ and a first interrogator antenna for transmitting said interrogation signal and receiving a first reply signal at a frequency $f_0$, and processing means,
   a passive RFID transponder including a first transponder antenna for receiving said interrogation signal and a chip comprising nonlinear components for generating said first reply signal in response to the interrogation signal, said first reply signal being transmitted by said first transponder antenna;
   characterized in that the RFID interrogator is arranged to receive a second reply signal whose frequency is a multiple of the predetermined frequency $f_0$, said multiple being either odd or even, said second reply frequency being generated by the nonlinear components of the transponder chip, said first and second reply signals being decoded by the processing means of the RFID interrogator in order to complete or improve the functionality of the system.

2. The system according to claim 1, wherein the frequency of the second reply signal is an odd multiple of the predetermined frequency $f_0$.

3. The system according to claim 1, wherein the frequency of the second reply is equal to $3f_0$.

4. The system according to claim 1, wherein the frequency of the second reply signal is an even multiple of the predetermined frequency $f_0$.

5. The system according to claim 1, wherein the first and second reply signals carry the same data.

6. The system according to claim 1, wherein the first and second reply signals carry different data.

7. The system according to claim 1, wherein the RFID interrogator comprises a second interrogator antenna arranged for receiving the second reply signal.

8. The system according to claim 7, wherein the first transponder antenna is a dual band antenna adapted to receive the first and second reply signals.

9. The system according to claim 8, wherein the first transponder antenna comprises a first inductive loop resonating at the predetermined frequency $f_0$, and a second inductive loop resonating at the frequency of the second reply signal.

10. The system according to claim 1, wherein the passive RFID transponder comprises a second transponder antenna adapted to transmit the second reply signal.

11. The system according to claim 10, wherein the first and second transponder antennas are electric dipoles.

12. The system according to claim 9, wherein the first transponder antenna comprises a first radiating track connected to the first inductive loop, and a second radiating track connected to the second inductive loop.

13. The system according to claim 1, wherein the first and second reply signals comprise coded data and, when said first and second reply signals are received by the RFID interrogator, the processing means of the RFID interrogator detects the simultaneous reception of said first and second reply signals and only decodes the data of the first reply signal.

14. The system according to claim 1, wherein the first and second reply signals comprise coded data and, when said first and second reply signals are received by the RFID interrogator, the processing means of the RFID interrogator detects the simultaneous reception of said first and second reply signals and decodes the data of the first and second reply signals.

* * * * *